United States Patent [19]

Cipu

[11] 4,181,216
[45] Jan. 1, 1980

[54] REVERSIBLE VIBRATOR, BOWL FEEDER WITH ANGLED SPRING SUPPORTS

[76] Inventor: George Cipu, 2215 Clarence Ave., Lakewood, Ohio 44107

[21] Appl. No.: 854,700

[22] Filed: Nov. 25, 1977

[51] Int. Cl.² .............................................. B65G 27/02
[52] U.S. Cl. ..................................... 198/757; 198/763
[58] Field of Search ............... 198/756, 757, 763, 766, 198/769, 753, 752, 391

[56] References Cited

U.S. PATENT DOCUMENTS

| | | | |
|---|---|---|---|
| 3,258,111 | 6/1966 | Spurlin et al. | 198/757 |
| 3,459,292 | 8/1969 | Piroutek | 198/757 |
| 3,757,932 | 9/1973 | Baljet et al. | 198/757 |

Primary Examiner—Robert B. Reeves
Assistant Examiner—Douglas D. Watts
Attorney, Agent, or Firm—Pearne, Gordon, Sessions

[57] ABSTRACT

A reversible vibratory parts feeder including a feeder bowl with an upwardly inclined spiral ramp mounted on a generally circular base. The base is flexibly supported on a massive mounting plate by a plurality of leaf springs extending angularly upward from the mounting plate and arranged in a circular, symmetrical array about the axis of the base. An electromagnetic motor is mounted on the mounting plate directly beneath the base in cooperating relation with an armature attached to the bottom of the base for causing oscillating vibratory movement of the base and the feeder bowl in a path of travel with both vertical and angular components as determined by the inclination of the leaf springs. The upper ends of the leaf springs are attached to the base by first reversible means pivotable about an axis extending radially from the vertical axis of the base to permit reversal of the direction of the inclination of the springs and also fine adjustment of the connection to accommodate the particular angle of inclination of the springs. The lower ends of the springs are attached to the mounting plate by second reversible means pivotable about a vertical axis and which also permit reversal of the direction of inclination. The lower ends of the springs are located radially inwardly of the upper ends to better accommodate the flexing of the springs due to angular deflection of the base during oscillating vibratory movement of the base and bowl.

3 Claims, 5 Drawing Figures

REVERSIBLE VIBRATOR, BOWL FEEDER WITH ANGLED SPRING SUPPORTS

BACKGROUND OF THE INVENTION

This invention relates to vibratory parts feeders of the type using a feeder bowl with a helical ramp and an electromagnetic motor cooperating with an armature to cause oscillating vibratory movement. More particularly, the invention relates to improvements in the means for mounting the inclined leaf springs that support the base on which the feeder bowl is mounted and especially to a mounting arrangement that minimizes the torsional force acting on the leaf springs and permits higher feed rates.

Vibratory parts feeders of the prior art generally utilize leaf-spring-type mounting arrangements including inclined leaf springs arranged in a circular symmetrical array and connected at the lower end to a massive mounting plate and at the upper end to a base that supports a parts feeder bowl. Vibratory oscillations are induced in the feeder bowl and base by a vibratory motor, such as an electromagnetic motor consisting of a field core attached to the mounting plate and surrounded by a coil winding. An armature is fixed to the bottom of the base at a location spaced from the pole face of the field core by an air gap.

Electrical energization of the coil winding attracts the armature pulling the base downward. Due to the angular orientation of the leaf springs, there is a horizontal component of movement of the feeder bowl as well as a vertical component. When the coil winding is energized with discreet current pulses, the feeder bowl is returned to its normal position by the leaf springs in the interval between current pulses. This repetitive, or vibratory, movement of the feeder bowl causes the objects therein, such as parts, to propagate in a desired manner.

The feeder bowl has a helical, inclined ramp along its inner side wall and the objects in the bowl are induced by the vibratory movement to move up the ramp so that with proper tooling the objects are oriented and advanced in single file orientation. The objects feed from the termination of the ramp at the rim of the feeder bowl, one by one, for automated processing or assembly with other objects.

In vibratory parts feeders of this type, the leaf springs are spaced circumferentially about and beneath the base and the horizontal component of movement of the feeder bowl is actually along an arcuate path. This is because the bowl is incrementally moved in an arcuate path back and forth about its vertical axis. Consequently, the leaf springs are subjected not only to a downward and sideways force resulting in normal leaf spring flexure transverse to their longitudinal axes, but also a torsional force causing them to twist about their longitudinal axes. As a result, the leaf springs operate with less than normal flexibility and the bolts, or the like, securing the ends of the leaf springs are subjected to significant stresses.

Typical prior art vibratory parts feeders of the general type to which the present invention is directed are the U.S. patents to Spurlin et al., U.S. Pat. No. 3,258,111; Piroutek, U.S. Pat. No. 3,459,292; and Baljet et al., U.S. Pat. No. 3,757,932. Among these, the patents to Piroutek and Spurlin show leaf spring mounting arrangements that permit reversal of the direction of inclination of the leaf springs to accommodate different directions, or hands, of parts feeding. Also, the patent to Piroutek shows a means for accommodating the torsional forces that act on the leaf springs during oscillation of the base.

It will be noted, however, that in all of these units, both upper and lower ends of the leaf spring elements are spaced the same radial distance from the axis of the feeder bowl. Thus, when the electromagnetic motor causes downward movement of the base and feeder bowl and the consequent angular movement of the base about the axis of the bowl, the leaf springs flex so that the upper ends thereof move back and forth in an arcuate path defined by a circumference taken about the axis of the base and, thus, a torsion or twisting action is applied to the leaf springs as they flex. This twisting action as indicated above interferes with the normal flexing movement of the springs and thus causes utilization of energy that does not contribute to the feed rate of parts being propagated by the feeder bowl.

The only suggested solution to this torsional force factor suggested by the prior art is obtained from the patent to Piroutek, U.S. Pat. No. 3,459,292, which discloses the use of tangentially located spring plates. Here, again, however, the flexing of the special spring plates in a radial direction absorbs energy that does not contribute ultimately to the feeding of parts by the bowl.

The present invention minimizes the difficulties described above and affords other features and advantages heretofore not obtainable.

SUMMARY OF THE INVENTION

It is among the objects of the invention to provide improvements in vibratory parts feeders of the type described for the purpose of minimizing the problems referred to above.

Another object of the invention is to minimize the torsional force acting on leaf springs in vibratory parts feeders of the type described.

These and other objects and advantages are achieved by the unique construction for a vibratory parts feeder embodying the invention wherein as in conventional units a generally circular base is flexibly supported on a massive mounting plate by a plurality of leaf springs extending angularly upward from the mounting plate and arranged in a circular, symmetrical array about the axis of the base. An electromagnetic motor is mounted on the mounting plate beneath the base and an armature is mounted on the bottom of the base in operative relationship with the electromagnetic motor. Alternating current is supplied to the electromagnetic motor to provide vibratory oscillations.

A feeder bowl with an upwardly inclined spiral ramp formed therein is mounted on the base and is oscillated thereby in vibratory fashion to propagate parts within the bowl in accordance with well-known prior art principles.

In accordance with the invention, there are provided a first reversible means for connecting the upper ends of the leaf springs to the base at symmetrically spaced locations around the circumference of the base and a second reversible means for connecting the lower ends of the leaf springs to the mounting plate. The second reversible means is spaced closer to the axis of the base and feeder bowl than the first reversible means so that the lower ends of the leaf spring members are spaced radially inwardly of the upper ends thereof and the leaf spring members extend angularly upwardly and outwardly relative to the axis of the base and feeder bowl, as well as angularly in a tangential plane relative to the base.

With this mounting arrangement, the upper ends of the leaf springs have a radially inward flexure component during oscillating movement that minimizes any torsional forces acting on the spring and enables the deflection of the spring to be primarily in its normal plane of flexure. This arrangement results in the minimizing of energy loss during vibratory feeding operations and, thus, in improved feed rates.

DESCRIPTION OF THE PREFERRED EMBODIMENT

Figure 1:
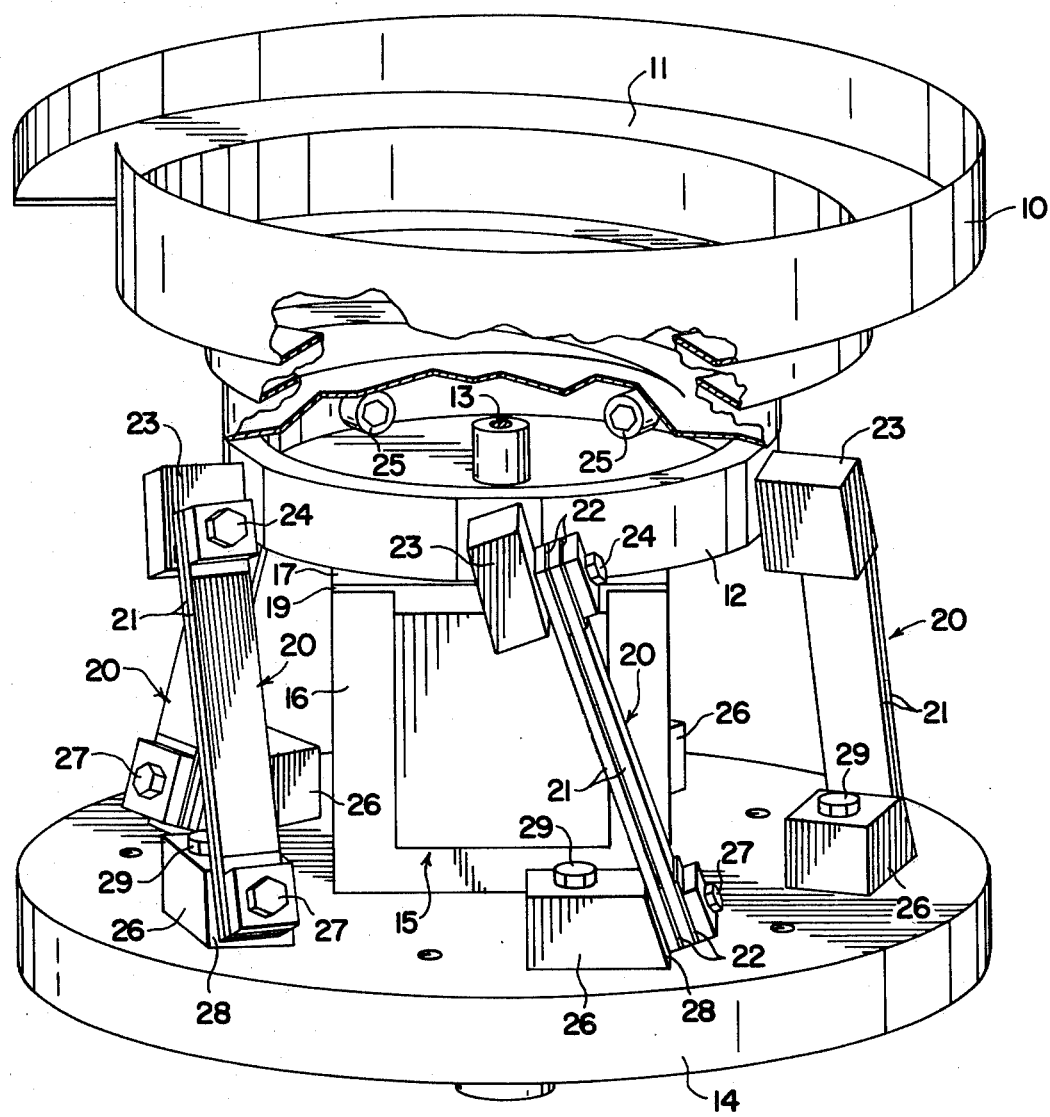
FIG. 1 is an isometric view of the vibratory parts feeder embodying the invention and with parts broken away for the purpose of illustration.
Figure 2:
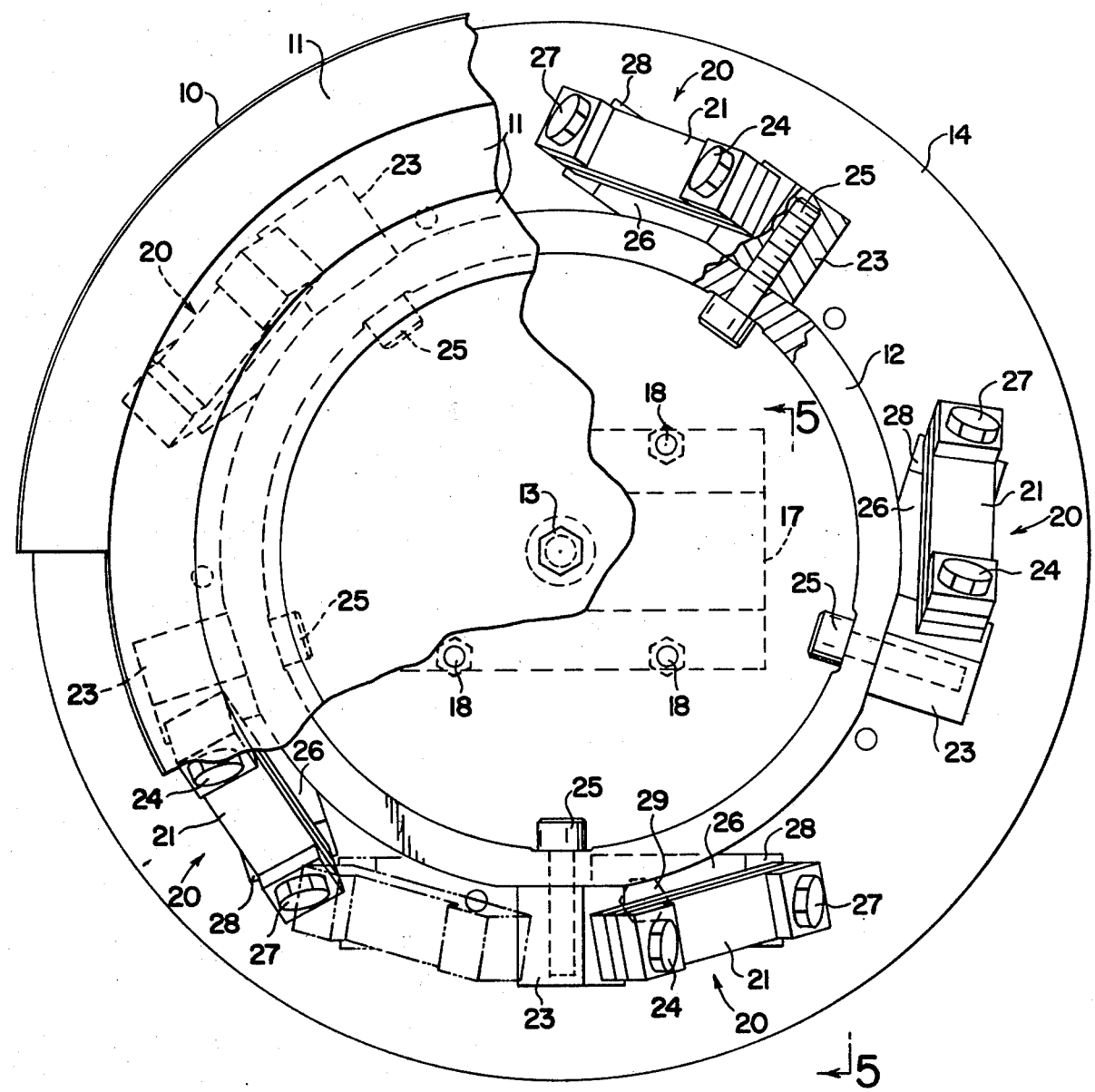
FIG. 2 is a plan view of the vibratory parts feeder of FIG. 1 with parts broken away and shown in section for the purpose of illustration.
Figure 3:
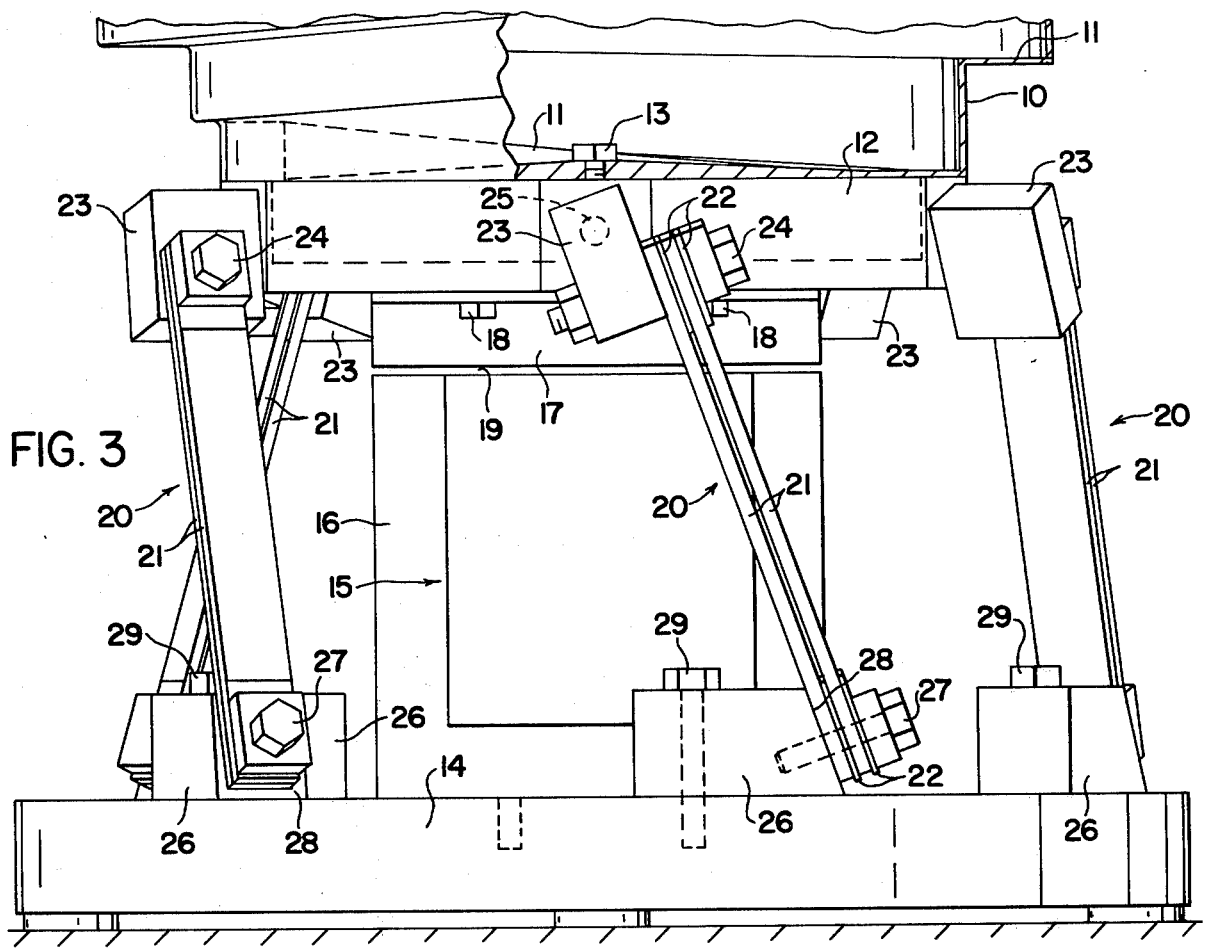
FIG. 3 is a fragmentary elevation of the vibratory parts feeder of FIGS. 1 and 2 with parts broken away and shown in section for the purpose of illustration.

Referring more particularly to the drawings, there is shown a vibratory parts feeder of the type embodying the invention and which includes as conventional components a feeder bown 10 having an upwardly inclined spiral ramp 11 therein, secured on a relatively massive circular base 12 by a machine screw 13. The base 12 is supported on a massive mounting plate 14 by a plurality of leaf spring assemblies 20 arranged in a circular array about the axis of the base and which will be described in greater detail below.

An electromagnetic motor 15, or vibratory, including a field core 16, is secured to the mounting plate in a central location beneath the base 12. An armature 17 is secured to the bottom of the base 12 by bolts 18 and is slightly spaced above the field core 16 to define an air gap 19.

When pulsating electrical energy (e.g., 3600 cps) is fed to the electromagnetic motor 15, or vibratory, oscillating motion of the feeder bowl 10 is produced with the result that objects therein move up the spiral ramp 11 in the feeder bowl 10 in the manner well-known in the art.

The leaf spring assemblies 20, of which there are five, comprise in the present instance, a pair of leaf springs 21 assemblied together and separated by spacers 22. The leaf spring assemblies 20 are located at uniformly spaced symmetrical locations about the axis of the bowl. The upper ends of the leaf springs 21 of each pair are bolted together between the spacers 22 and secured to a pivotable upper mounting block 23 by bolts 24. The upper mounting blocks 23 are secured to an upwardly extending rim, or flange, of the base 12 by machine screws 25.

The blocks 23 rest against flat portions machined in the rim base 12, and the machine screws 25 extend outwardly in a radial direction relative to the axis of the feeder bowl 10 through the rims or flange of the base 12 and into tapped holes in the blocks 23.

Normally, the screws 25 are not tightened down until the leaf springs 21 are first tightened into position. This permits very accurate location of the blocks to properly match the angle at which the leaf springs 21 are set in their normal unflexed condition.

The lower ends of the leaf spring assemblies 20 are secured to lower mounting blocks 26 by machine screws 27. The lower end of the respective leaf spring 21 rests agsinst a beveled surface 28 of the respective mounting block which surface 28 is machined to the proper angle at which the leaf springs 21 are to be inclined. As will be pointed out below, this angle has been found to be most advantageously established at 20°. The lower mounting blocks 26 are anchored to the mounting plate 14 by machine screws 29 that extend in a vertical direction through the blocks 26 and into tapped openings in the mounting plate.

Figure 4:
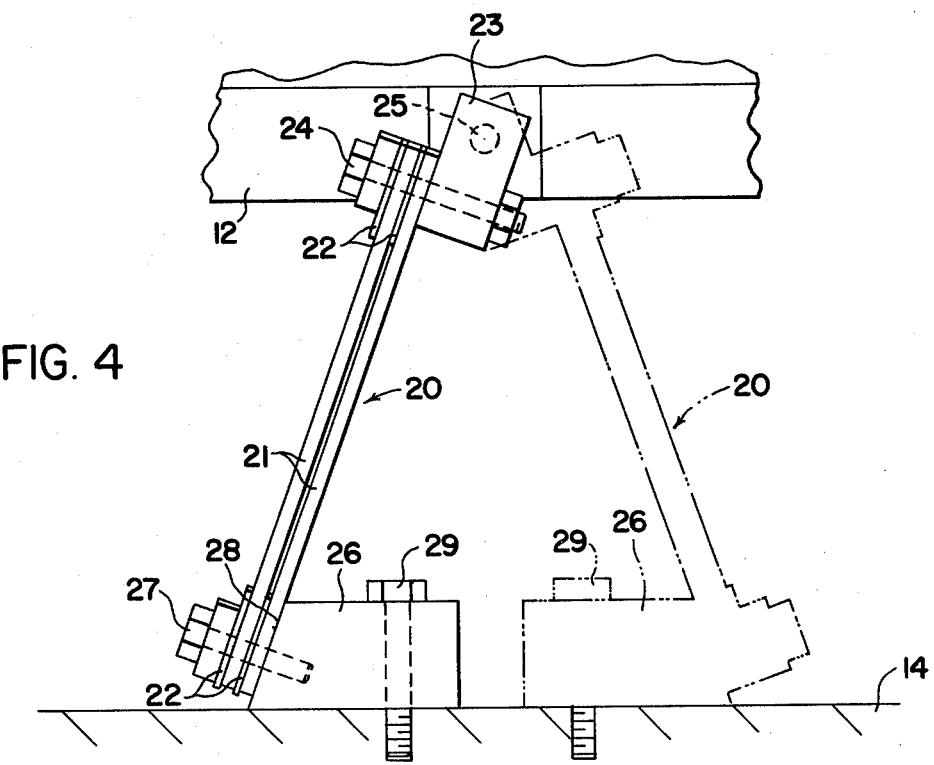
FIG. 4 is a fragmentary sectional view taken on the line 4—4 of FIG. 2.

It will be noted that the blocks 26 are secured by only one machine screw 29 and, accordingly, by loosening the machine screw, the block may be adjusted about the vertical axis of the respective machine screw 29 to properly match the orientation of the respective leaf spring assembly 20. Also, the blocks may be easily reversed, as illustrated in FIG. 4, by merely mounting them in a reverse orientation to accommodate reversal of the direction of feed of the feeder bowl 10. A separate set of tapped openings in the mounting plate is provided for this purpose.

It will be noted that the upper mounting block 23 is pivotable for adjustment about a horizontal axis defined by the respective machine screw 25 that extends in a radial direction through the vertical axis of the feeder bowl 10 and base 12, while the lower mounting blocks 26 are pivotable for adjustment about a vertical axis defined by the respective machine screw 29. These two axes of adjustment for each leaf spring assembly are not parallel to one another and thus permit an infinite amount of adjustment of the orientation of the leaf spring assemblies 20 relative to the base 12 and the mounting plate 14. These adjustments are made after the leaf springs 21 are tightly secured at each end to the blocks 23 and 26, respectively. Accordingly, final tightening of the leaf spring assemblies 20 into position using the machine screws 25 and 29 is accomplished in such a way that no prestressing of the leaf springs 21 occurs.

Figure 5:
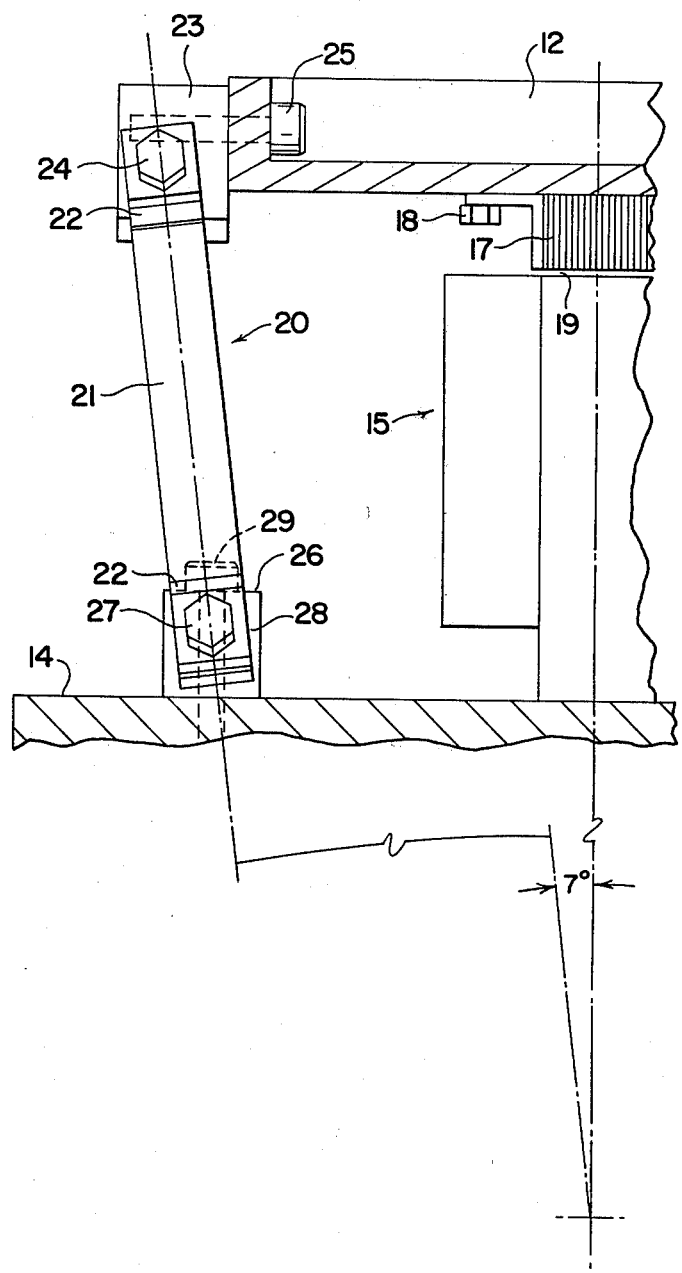
FIG. 5 is a fragmentary sectional view taken on the line 5—5 of FIG. 2.

Referring to FIG. 5, it will be noted that the leaf spring assemblies 20 are not only inclined in a plane parallel to the axis of the feeder bowl 10, but also they are inclined at an angle upwardly and outwardly relative to the axis of the feeder bowl 10. In the embodiment shown, this angle of inclination is 7°, as indicated in FIG. 5.

This arrangement is utilized in accordance with the invention to better accommodate the arcuate oscillating movement of the base caused by the induced vibrations. When the armature is pulled downward by the electromagnetic motor 15, the downward movement of the base is accompanied by an angular movement of the base through a slight rotation as defined by the leaf spring assemblies 20 flex downwardly somewhat as a result of this oscillating movement and, since the angular movement occurs, there is a tendency to apply a torsional load on the leaf spring.

The effects of this torsional load are minimized by the outwardly and upwardly angular extension of the leaf spring assemblies, since the flexing of the springs would tend to bring them more closely into a plane parallel to the axis of the feeder bowl.

It has been found that with the arrangement described, a higher rate of feed is provided, as compared to units of the prior art.

While an angle of 7° is utilized in the embodiment shown, this is merely an optimum angle that has been found suitable for specific purposes, although greater or lesser angles may be found more effective in other circumstances.

While the invention has been shown and described in connection with a specific embodiment thereof, this is for the purpose of illustration rather than limitation and other variations and modifications will be apparent to those skilled in the art, all within the intended scope and spirit of the invention. Accordingly, the patent is not to be limited in scope and effect to the specific embodiment herein shown and described, nor in any other way that is inconsistent with the extent to which the progress in the art has been advanced by the invention.

I claim:

1. In a vibratory parts feeder including a generally circular base flexibly supported on a massive mounting plate by a plurality of leaf spring members extending angularly upward from said mounting plate and arranged in a circular symmetrical array about the axis of said base, an electromagnetic motor mounted on said mounting plate, an armature mounted on the bottom of said base and in operative relationship with said electromagnetic motor, alternating current supply means connected to said electromagnetic motor and a feeder bowl with an upwardly inclined spiral ramp formed therein, the improvement which comprises:

first reversible means for connecting the upper ends of said leaf spring members to said base at symmetrically spaced locations around the circumference of said base, said first reversible means comprising, for each leaf spring member, and upper mounting block secured to said circular base, said upper mounting block being adjustable relative to said base about a horizontal axis extending radially outward from said base whereby said block may be adjusted to correspond to the angle of inclination of its respective leaf spring member and may be positioned to accommodate a reverse angle of inclination of its respective leaf spring member, each leaf spring member being connected to its respective upper mounting block by a single threaded fastener to permit a natural unstressed securing of each leaf spring member to its respective block before said threaded fastener is tightened down, and second reversible means for connecting the lower ends of said leaf spring members to said mounting plate, said second reversible means comprising for each leaf spring member, a lower mounting block secured to said mounting plate and having a surface beveled at an angle relative to said mounting plate that conforms to the desired angle of inclination of said leaf spring member, said lower mounting block being adapted for pivotal adjustment about a vertical axis to conform to the orientation of its respective leaf spring member and to accommodate a reverse angle of inclination of its respective leaf spring member, each leaf spring member being secured against said beveled surface of its respective lower mounting block by a single threaded fastener to permit a natural unstressed securing of each leaf spring member to its respective lower mounting block before said threaded fastener is tightened down, said second means being spaced closer to said axis of said base than said first means whereby the lower ends of said leaf spring members are spaced radially inwardly of the upper ends thereof and said leaf spring members extend angularly upwardly and outwardly relative to said axis of said base as well as angularly in a tangential plane relative to said base.

2. A vibratory parts feeder as defined in claim 1 wherein each of said upper mounting blocks is secured to said circular base by a single threaded fastener oriented in a position corresponding to said horizontal radial axis.

3. A vibratory parts feeder as defined in claim 1 wherein each of said lower mounting blocks is secured to said mounting plate by a single threaded fastener oriented to correspond to said vertical pivot axis.

* * * * *